(12) United States Patent
Zhu et al.

(10) Patent No.: US 9,495,995 B1
(45) Date of Patent: Nov. 15, 2016

(54) ADJUSTING LASER POWER TO ACHIEVE EQUIVALENT TRACK SPACING FOR PAIRED HEADS THAT SIMULTANEOUSLY WRITE TO A HEAT-ASSISTED RECORDING MEDIUM

(71) Applicant: Seagate Technology LLC, Cupertino, CA (US)

(72) Inventors: Wenzhong Zhu, Apple Valley, MN (US); Kenneth Haapala, Plymouth, MN (US); Jon Trantham, Chanhassen, MN (US); Edward Charles Gage, Lakeville, MN (US)

(73) Assignee: SEAGATE TECHNOLOGY LLC, Cupertino, CA (US)

( * ) Notice: Subject to any disclaimer, the term of this patent is extended or adjusted under 35 U.S.C. 154(b) by 0 days.

(21) Appl. No.: 14/834,886

(22) Filed: Aug. 25, 2015

(51) Int. Cl.
| G11B 5/02 | (2006.01) |
| G11B 7/1263 | (2012.01) |
| G11B 5/48 | (2006.01) |
| G11B 5/00 | (2006.01) |
| G11B 5/60 | (2006.01) |
| G11B 5/012 | (2006.01) |
| G11B 20/10 | (2006.01) |

(52) U.S. Cl.
CPC .............. *G11B 7/1263* (2013.01); *G11B 5/02* (2013.01); *G11B 5/4886* (2013.01); *G11B 5/012* (2013.01); *G11B 5/6088* (2013.01); *G11B 20/10453* (2013.01); *G11B 2005/0021* (2013.01)

(58) Field of Classification Search
None
See application file for complete search history.

(56) References Cited

U.S. PATENT DOCUMENTS

| 8,797,672 | B2 | 8/2014 | Tanabe et al. |
| 8,929,186 | B1 | 1/2015 | Sharma et al. |
| 2009/0225464 | A1* | 9/2009 | Juang .................... G11B 5/314 360/59 |

* cited by examiner

*Primary Examiner* — Brian Butcher
(74) *Attorney, Agent, or Firm* — Hollingsworth Davis, LLC

(57) ABSTRACT

A relatively larger nominal track spacing associated with a first write head is determined and a relatively smaller nominal track spacing associated with a second write head is determined. The first and second write heads simultaneously write to respective different first and second surfaces of a heat-assisted recording medium. A laser write power for a selected one of the first write head and the second write head is changed to enable the first write head and the second write head to operate at an equivalent nominal track spacing.

20 Claims, 8 Drawing Sheets

ADJUSTING LASER POWER TO ACHIEVE EQUIVALENT TRACK SPACING FOR PAIRED HEADS THAT SIMULTANEOUSLY WRITE TO A HEAT-ASSISTED RECORDING MEDIUM

SUMMARY

Various embodiments described herein are generally directed to adjusting laser power to achieve equivalent track spacing for paired heads that simultaneously write to a heat assisted recording medium. In one embodiment, a relatively larger nominal track spacing associated with a first write head is determined and a relatively smaller nominal track spacing associated with a second write head is determined. The first and second write heads simultaneously write to respective different first and second surfaces of a heat-assisted recording medium. A laser write power for a selected one of the first write head and the second write head is changed to enable the first write head and the second write head to operate at an equivalent nominal track spacing.

These and other features and aspects of various embodiments may be understood in view of the following detailed discussion and accompanying drawings.

BRIEF DESCRIPTION OF THE DRAWINGS

The discussion below makes reference to the following figures, wherein the same reference number may be used to identify the similar/same component in multiple figures.

DETAILED DESCRIPTION

Figure 1:
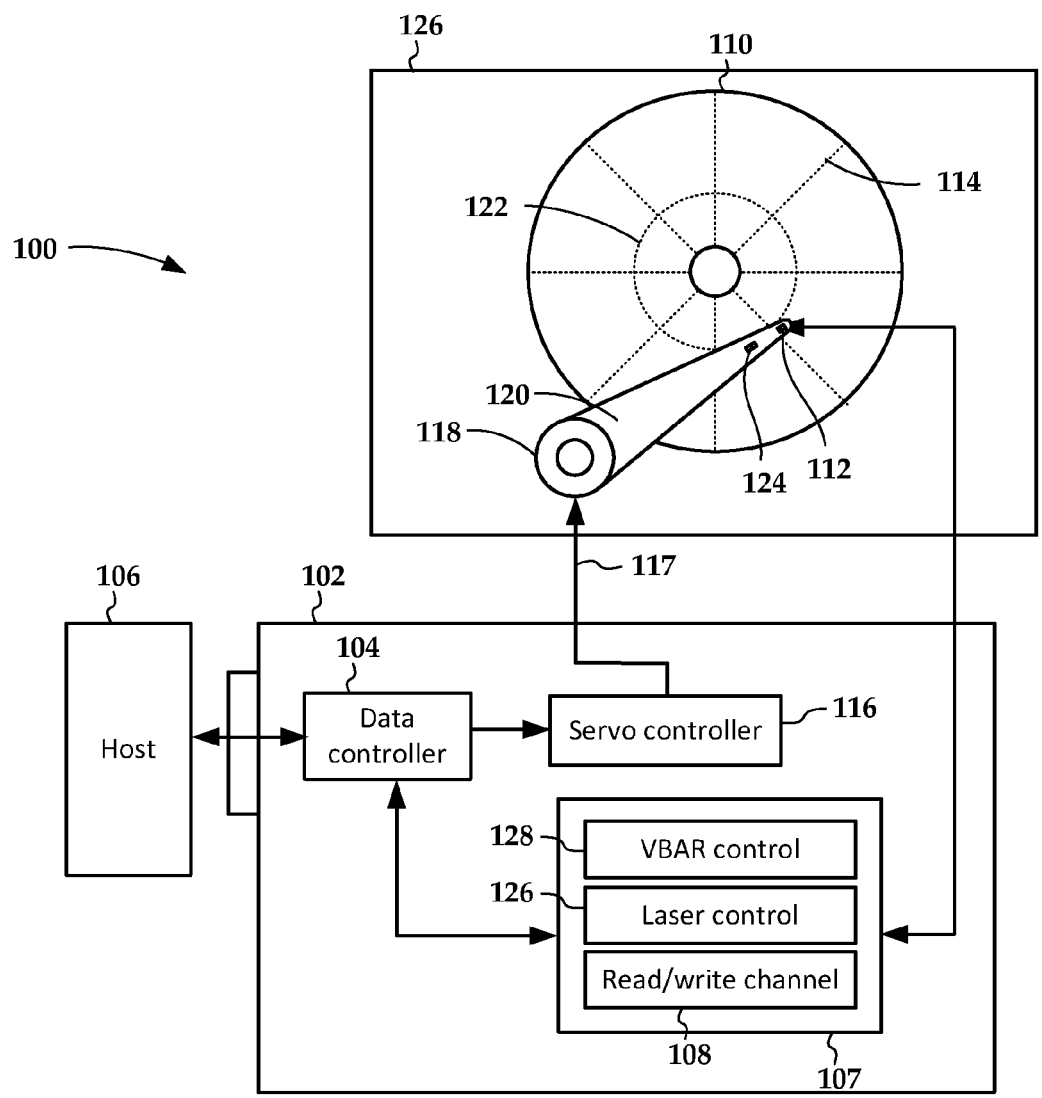
FIG. 1 is a block diagram of an apparatus according to an example embodiment.

Many hard disk drives include two or more read/write heads that are capable of reading data from two or more magnetic disk surfaces. For example, if a drive includes a single disk, two read/write heads may read from opposite sides of the disk. This can be extended to more than one disk, e.g., four read/write heads reading from two disks. In such a case, only one of the read/write heads is usually used at a time, e.g., for reading from or writing to one of the disk surfaces. Control is switched from head-to-head depending on which disk surface needs to be accessed to fulfill host requests.

The following disclosure relates to hard disk drive that allows for two or more read/write heads to operate in parallel. This can, in some applications, increase data throughput by simultaneously reading from and/or writing to two more read/write heads that are located over different surfaces of one or more disks. In other applications, this may be used to improve reliability by simultaneously writing and/or reading redundant data via each of the heads. The read/write heads will generally be coupled to an actuation structure that moves all the heads together, e.g., a multi-arm assembly that is driven by a voice coil motor. A servo system controls the voice coil motor to position the heads over tracks on the disk. Microactuators associated with each read/write heads may be used to individually position of each of the read/write heads over the tracks.

In embodiments described herein, paired heads are shown as being on either side of a single disk, however, in the concepts described below may be applicable paired heads may be associated with different disks. For example, two paired heads may read from or write to top surfaces of first and second disks. In other examples, four heads may simultaneously read from and write to top and bottom sides of first and second disks. Although the term "paired" might imply two matched heads, for purposes of this discussion, more than two read/write heads that simultaneously access different surfaces of disks will also be referred to as "paired" to each other.

There are a number of challenges when trying to track two or more read/write heads over different surfaces at the same time. One of these challenges relates to matching spacing of tracks that are read simultaneously from different surfaces. Generally, track spacing is the center-to-center distance between adjacent tracks, sometimes expressed in tracks-per-inch (TPI). The nominal TPI value of a particular region of a recording medium is a function of the width of the written magnetic data plus the width of guard bands (if any) that reduce cross track interference and allow for servo positioning errors (track miss-registration). It is desirable for regions that are written or read simultaneously to have matching track spacing/TPI, e.g., to maximize throughput, simplify tracking, etc. Although it is possible to increase the track spacing of a head with a narrower writer system without any other changes and thereby match a different head's wider writer, doing this may reduce the potential areal density, since the additional media surface being consumed for track spacing matching does not store any additional data.

A disk drive that allows parallel read/writes as described above may also utilize a technology known as heat-assisted media recording (HAMR), and so additional factors may need to be considered when setting the TPI of recorded data. A HAMR device, also referred to as energy-assisted magnetic recording (EAMR), thermally-assisted magnetic recording (TAMR), and thermally-assisted recording (TAR), etc., uses an energy source such as a laser to create a small hotspot on a magnetic disk during recording. The heat lowers magnetic coercivity at the hotspot, allowing a write transducer to change magnetic orientation, after which the hotspot is allowed to rapidly cool. Due to the relatively high coercivity of the medium after cooling, the data is less susceptible to data errors due to thermally-induced, random fluctuation of magnetic orientation known as the paramagnetic effect.

The parameters of the hotspot (e.g., size, temperature, thermal gradient) can control the areal density of data recorded to the disk. In current designs, the size of the hotspot is significantly smaller than a region of the recording medium affected by the magnetic field applied by the write pole via a write coil. Because the parts regions outside the hotspot are under the Curie temperature, changes to magnetic orientation of the media due to the applied magnetic field will only occur in the hotspot region, thus the hotspot, not the write pole, defines the crosstrack width of the bits. The timing of the write signal applied to the write coil changes the downtrack size of the bit (sometimes expressed in bits-per-inch, or BPI), because it is the magnetic transitions applied by the write pole that determine downtrack bit boundaries.

Due to this relationship between the write signal and the size of the hotspot on respective crosstrack and downtrack dimensions of the bits, the aspect ratio (e.g., the ratio of downtrack to crosstrack dimensions) of the bits can be varied by changing of factors such as laser power, fly height, and timing of write signals. To obtain sufficient signal strength when reading back the bits, the bits may have to satisfy some minimum size constraints. For example, if the tracks are written narrowly (corresponding to lower laser power, smaller hotspot, smaller track spacing, and higher TPI), it may be necessary to increase downtrack bit length to ensure reliable detection of magnetic transitions. Conversely, if the tracks are written wider (corresponding to higher laser power, larger hotspot, larger track spacing, and lower TPI), it may be possibly to decrease downtrack bit length while still ensuring reliable detection of magnetic transitions.

The ability to vary bit aspect ratio by varying write signals and laser power applied to the recording medium provides flexibility in configuring the disk drive for operation. For example, due to factors such as skew angle, media characteristics, etc., it may be beneficial to define different zones on the recording medium with different bit aspect ratios to optimize characteristics such as areal density, signal-to-noise ratio, and reliability. However, as noted above, this can complicate simultaneous read/writes on different surfaces of a HAMR recording medium. For example, the track spacing may determine whether data on two different read write heads may be simultaneously accessed. If the track spacing of the two read write heads is different, simultaneous access may not be possible on some tracks, since the relative alignment of tracks between heads changes across the media surface (due to the different track spacing), and it may not be possible to accommodate the offset. Moreover, even if the two heads may accommodate a wider position offset, the head with the narrower track spacing (higher TPI) will have more tracks than the other head, so the pairing-up of all tracks between the two heads is not possible. Conversely, the tracks of two different read write heads with matched track spacing will typically always be aligned. Accordingly, the present disclosure describes apparatuses, systems, and methods that facilitate efficient simultaneous read/writes on different surfaces of a HAMR recording medium over a number of tracks.

In FIG. 1, a perspective view that illustrates components of a hard drive apparatus 100 that is capable of parallel read/write operations according to an example embodiment. The apparatus includes circuitry 102 such as a system controller 104 that processes read and write commands and associated data from a host device 106. The host device 106 may include any electronic device that can be communicatively coupled to store and retrieve data from a data storage device, e.g., a computer. The system controller 104 is coupled to a read/write head interface section 107 that include circuitry that facilitates communications with two or more read/write heads 112. It will be understood that the term "read/write head" used herein may be also be applicable, under the appropriate circumstances to read-only heads or write-only heads, as well as heads that provide both functions.

The recording interface section 107 includes a read/write channel 108 that reads from and writes to surfaces of one or more magnetic disks 110 via the read/write heads 112. The read/write channel 108 generally converts data between the digital signals processed by the data controller 104 and the analog signals conducted through the read/write heads 112 during read operations. To facilitate read and write operations, the read/write channel 108 may include analog and digital circuitry such as preamplifiers, filters, decoders, digital-to-analog converters, timing-correction units, etc. The read/write channel 108 also provides servo data read from servo wedges 114 on the magnetic disk 110 to a servo controller 116. The servo controller 116 uses these signals to provide position control signals 117 to a VCM 118. The VCM 118 rotates an arm 120 upon which the read/write heads 112 are mounted in response to the control signals 117. The position control signals 117 may also be sent to microactuators 124 that individually control each of the read/write heads 112, e.g., causing small displacements at each head.

Data within the servo wedges 114 is used to detect the location of a read/write head 112 relative to the magnetic disk 110. The servo controller 116 uses servo data to move read/write heads 112 to an addressed track 122 and block on the magnetic disk 110 in response to the read/write commands (seek mode). While data is being written to and/or read from the disk 110, the servo data is also used to maintain the read/write head 112 aligned with the track 122 (track following mode).

In this example, the read/write channel 108 and the servo controller 116 are configured to utilize two or more of the read/write heads 112 simultaneously, e.g., for simultaneous read and/or write operations from/to different surfaces of the disk(s) 110. In order to accommodate separate positioning of the different read/write heads 112, the servo controller may include a multi-head tracking module (not shown) that facilitates sending separate, simultaneous control signals 117 to control different read/write heads 112, e.g., via the VCM 118 and different microactuators 124.

As noted above, the recording medium 110 is configured for HAMR recording, and so the recording interface circuitry 107 also includes a laser control module 126 that controls lasers coupled to the read/write heads 112. The laser control module 126 may include signal conditioning circuitry (e.g., amplifiers, filters) and logic circuitry (e.g., gates, state machines, processors, stored instructions) to control the lasers to form hotspots on the disk(s) 110 during writing in coordination with the read/write channel 108. A variable bit aspect ratio (VBAR) module 128 provides some coordination between the read/write channel 108 and laser control module 126, at least for managing track spacings associated with first and second write heads that simultaneously write to respective different first and second surfaces of a heat-assisted recording medium 110. This allows matching track spacings between the heads, improving tracking ability of both heads. The VBAR module 128 may include specialized instructions and circuitry, and is generally controlled by the system controller 104.

Figure 2:
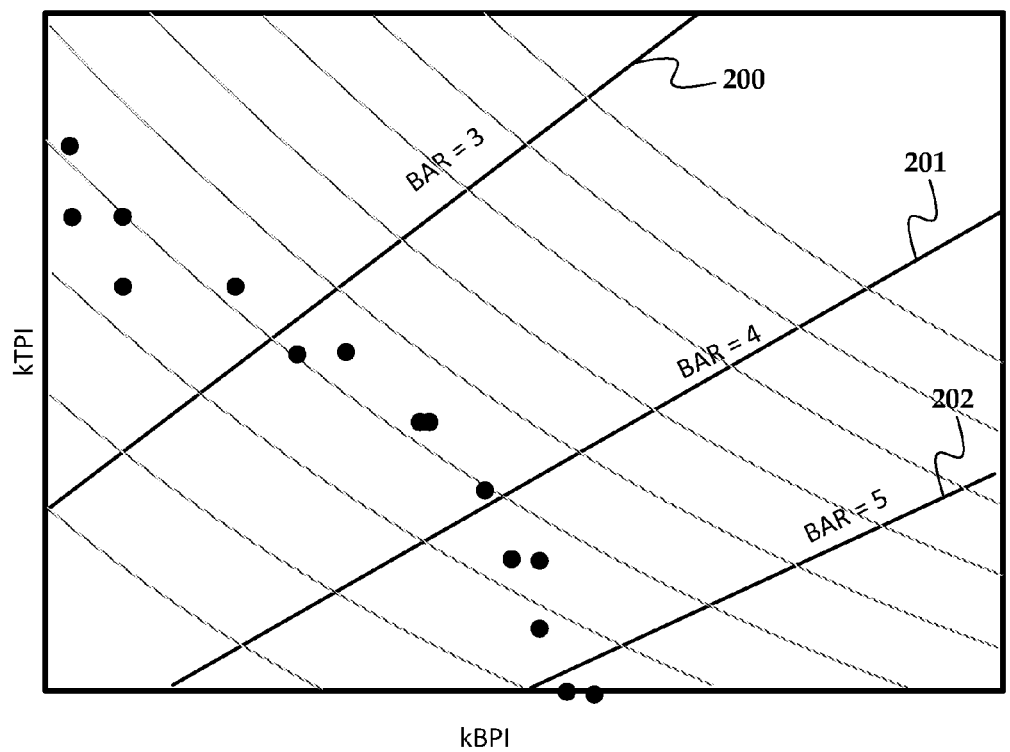
FIG. 2 is a graph showing available bit aspect ratios of a data storage device according to an example embodiment.

In embodiments described below, HAMR laser power is adjusted to match the track spacing for paired heads. The nominal minimum track spacing is predominately defined by laser power instead of width of the magnetic write pole. The laser power can be adjusted such that the track spacing for two or more paired heads (e.g., two heads on opposite surfaces of the same disk) is the same. In FIG. 2, a graph shows the linear density (expressed in kBPI) and track spacing (expressed as kTPI) for a single HAMR recording head according to an example embodiment. Lines 200-202 represent regions of constant BAR, in this case expressed as BPI/TPI. The curved grey lines represent constant area density capacity. The different points in the figure are obtained by adjusting laser current for a set of test tracks at the indicated kTPI and kBPI values. For each point, the track spacing was set and then kBPI adjusted to meet a target bit error rate (BER).

Figure 3:
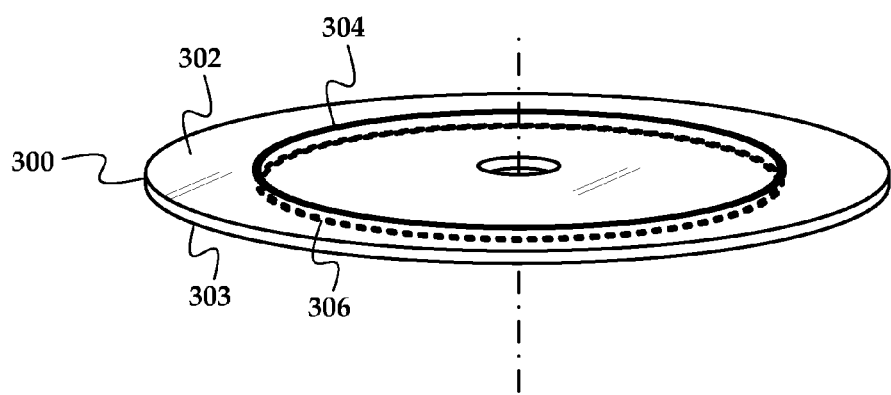
FIG. 3 is a perspective view of a disk showing matched serpent regions according to an example embodiment.

As noted above, when the TPI between paired heads on the same disk do not match, a performance penalty may occur. In FIG. 3, a perspective view shows a magnetic disk 300 that is part of a HAMR data storage device. Each surface 302, 303 of the disk 300 are read from and written to by separate read/write heads (not shown). For a conventional hard drive, sequentially written data that reaches a certain size may be mapped into different sectors and tracks over the surfaces 302, 303, here shown as portions 304, 306. These portions 304, 306 may be referred to as "serpents." In a conventional hard drive, transitioning from one serpent 304 to another 306 involves a head switch.

Figure 4:
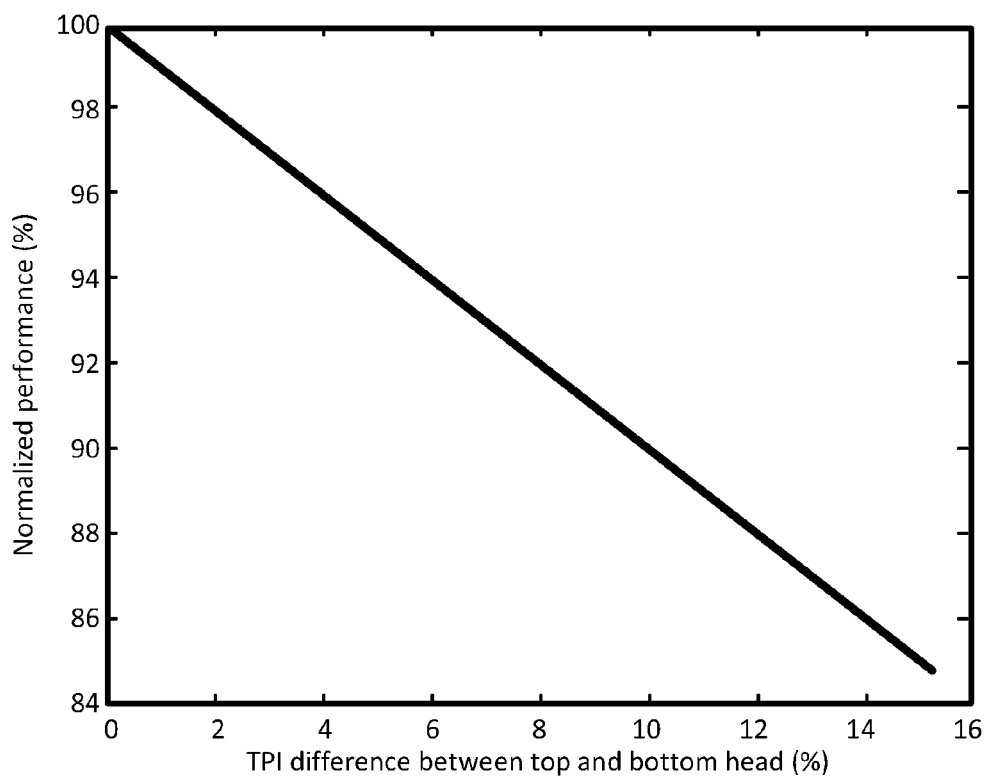
FIG. 4 is a graph illustrating how track spacing mismatch can affect performance in data storage device according to an example embodiment.

When the heads that respectively write to surfaces 302, 303 are paired with heads with the same track spacing, the heads may write to and read from serpents 304, 306 simultaneously. However, if the track spacing/TPI used by the heads are different, the number of tracks in each serpent 304, 306 may be different. For example, if the normalized serpent size is 33 tracks, and if the top head over surface 302 is set to read/write 35 tracks and a bottom head over surface 303 read/writes 31 tracks, the bottom head will be idle 4 revolutions (35−31=4) per serpent size. This results in a loss of about 5.8% in sequential performance. The graph in FIG. 4 shows an example of performance penalty vs. TPI mismatch for paired heads according to an example embodiment. In this graph, it is assumed that the heads write at the same BPI but at different TPI. Generally, the embodiments described herein will attempt to ensure TPI difference is at or near zero.

Because the track width in HAMR is predominately defined by laser power instead of write width, the laser power can be adjusted to achieve the same TPI for two or more paired heads. The track width and separation may be set during a factory process, e.g., when the assembled drive is initially tested and configured. This initial configuration may involve region-specific writing of test tracks using different values of TPI and BPI to achieve some target performance metric, e.g., a target data storage capacity at or below a threshold BER. Once each matching region each have a TPI selected in this way, then the TPI of one of the matching regions may be adjusted so that the difference in TPI between the two regions is at or close to zero.

In one case, a selected one of the matching regions with the lower TPI (which involves a higher laser power that writes a wider track) has TPI increased by applying a lower laser power during writes. This may also involve decreasing the BPI for these regions to satisfy the target performance metrics noted above. In another case, the regions with the higher TPI (which involves a lower laser power that writes a narrower track) has TPI decreased by applying a higher laser power. This may also involve increasing the BPI for these regions to satisfy the target performance metrics noted above. These two techniques may be both used on the same device, e.g., increasing TPI for one of a matching region pair for some regions, and decreasing TPI for one of a matching region pair for other regions. Further, where there are more than two paired regions, a middle value of TPI may be selected. In such a case, some of the matching regions are adjusted to have an increase in TPI, while others of the matching regions are adjusted to have a decrease in TPI.

Figure 5:
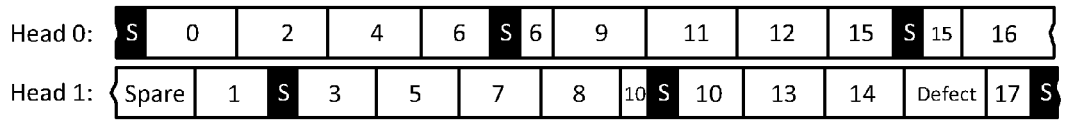
FIG. 5 is a block diagram showing tracks with different bit densities written by paired heads according an example embodiment.

In should be noted that changing BPI in response to TPI should not significantly reduce sequential performance since both heads can always write/read simultaneously even at different values of BPI. In FIG. 5, a diagram illustrates portions of matching tracks on different disk surfaces that are read by two different heads (0 and 1) simultaneously. The dark portions represent servo control marks. The white portions represent data sectors, the numbers indicating a mapping of logical data blocks to sectors. Spare and defective sectors are also shown in the track associated with head 1. Note that data sectors can span servo marks, e.g., as indicated by blocks 6, 15, and 10. The BPI of the track associated with head 0 has lower BPI than the track associated with head 1, as indicated by the larger downtrack dimension of the data sectors of the top track. The ability to mate-up different BPIs can be managed in the controller design, e.g., using different clocks for each decoder, increased buffering of data from tracks with higher BPI, etc.

Figure 6:
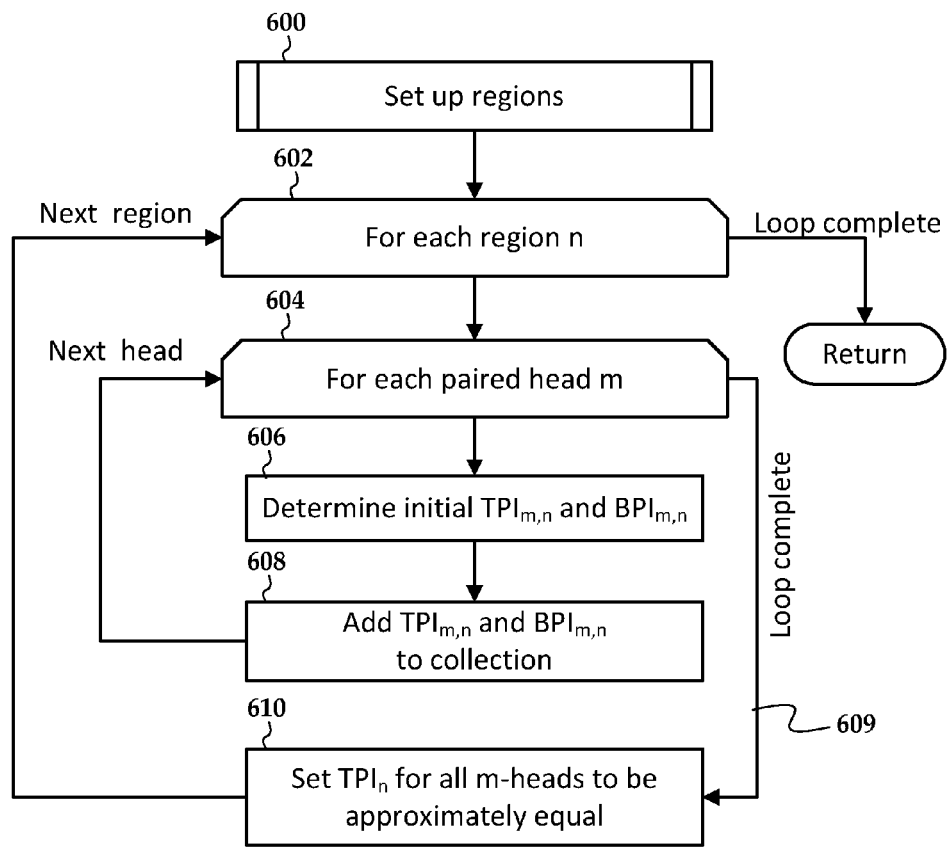
FIGS. 6-10 are flowcharts showing procedures according to example embodiments.

In FIG. 6, a flowchart illustrates an example procedure 600 for setting up regions of disk surfaces according to example embodiments. The regions may correspond to different radial zones each having different numbers of servo marks per track. Other region definitions may also be used, e.g., sub-zones, serpents. A loop limit 602 iterates through each region, and an inner loop limit 604 iterates through each paired head. The use of the term "paired" in this example is not meant to be limited to only two heads. For example, if three heads read and/or write simultaneously, the loop 604 will be traversed three times.

At block 606, an initial TPI specific to each head and regions ($TPI_{m,n}$) is determined. This determination may be made in any number of ways, such as iterating through various combinations of BPI and TPI until some target is met such as target areal density, maximum areal density, target BER, or any combination thereof. This will also result in a BPI specific to the head and zone ($BPI_{m,n}$). At block 608, the values of $TPI_{m,n}$ and $BPI_{m,n}$ are added to a collection of data, e.g., an array. For example, the collection may be an n×m array of ordered pairs of the form (TPI, BPI). After all heads have been iterated through, as indicated by path 609, block 610 is executed, which sets zone specific TPI ($TPI_n$) to be the same or nearly the same for all the m-heads. The $TPI_n$ may be set in a number of ways, examples of which are shown in the flowcharts of FIGS. 7 and 8, which utilize the n×m collection of TPI and BPI data created at block 608.

Figure 7:
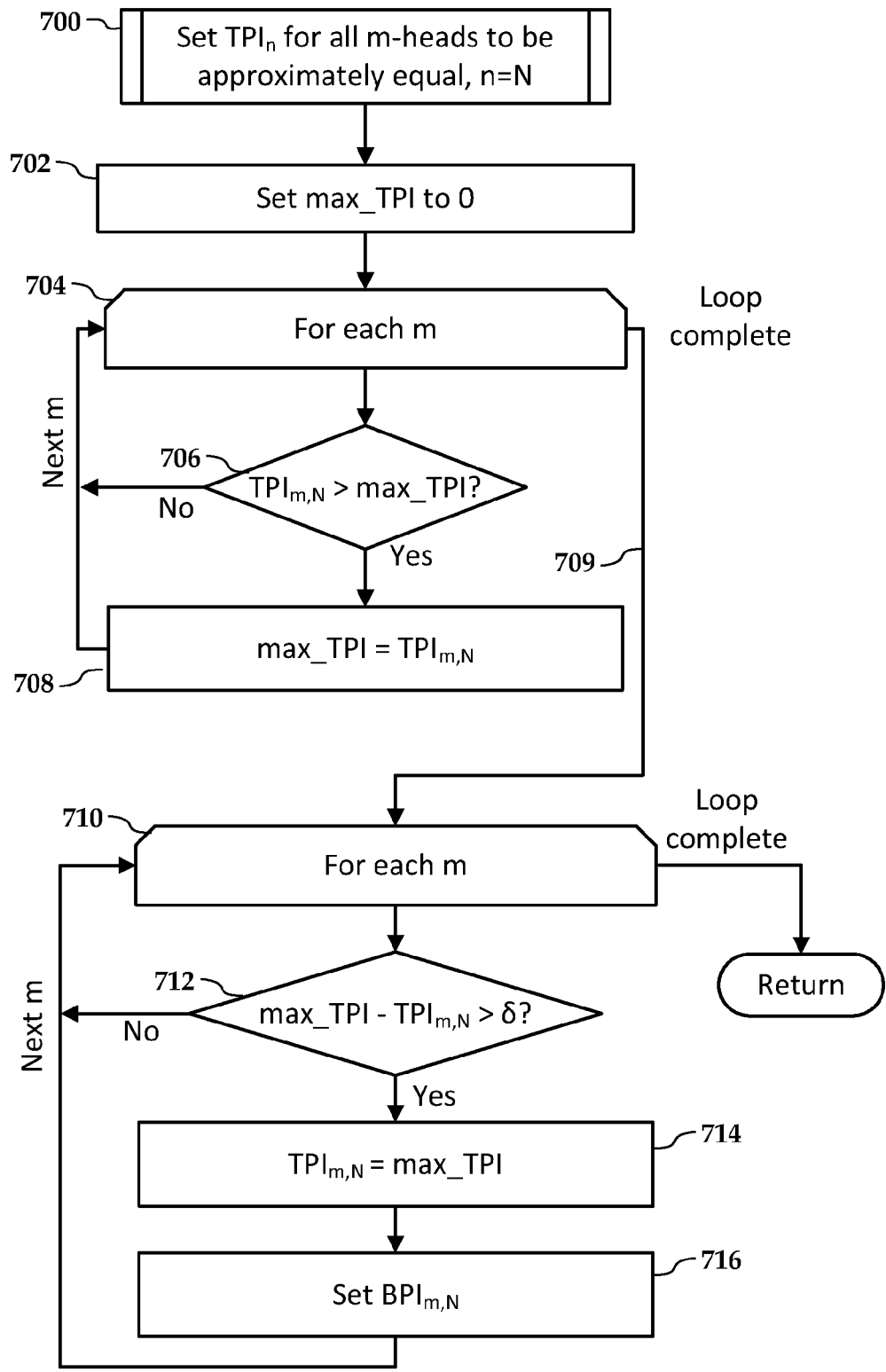

In FIG. 7, a flowchart shows an example procedure 700 for setting a zone specific TPI to be the same or nearly the same for all the m-heads that are paired together. In this example, the maximum TPI of the m-heads is selected, and the laser power of the other heads is decreased to obtain a larger TPI. The region variable, n, is set to a fixed value, N, for purposes of this procedure. At block 702, a temporary variable max TPI is initialized to zero. Loop 704 iterates through each of the m TPI values, comparing 706 them to the maximum. If a TPI is larger than the current maximum, then the temporary value is set 708 to this TPI value. Upon exiting 709 the loop 710, max TPI will hold the largest value of TPI for region N.

Loop 710 again iterates through each of the m-TPI values. If it is determined 712 that a difference between the current TPI and max TPI is greater than a threshold value δ, then the current TPI is instead set 714 to the maximum value. If δ=0, then TPI for all heads will be the same. In some cases, it may be acceptable to set δ>0, e.g., to reduce the time to perform testing. Because of the change to TPI in block 714, the BPI of the current head may optionally be set 716, e.g., decreased to compensate for the increase in TPI). This may involve repeating a characterization procedure similar to that performed at block 606 in FIG. 6, except that the TPI in this case will be fixed. The changes made in blocks 714 and 716 are recorded (e.g., in firmware) and used when accessing each region during operation of the device.

Figure 8:
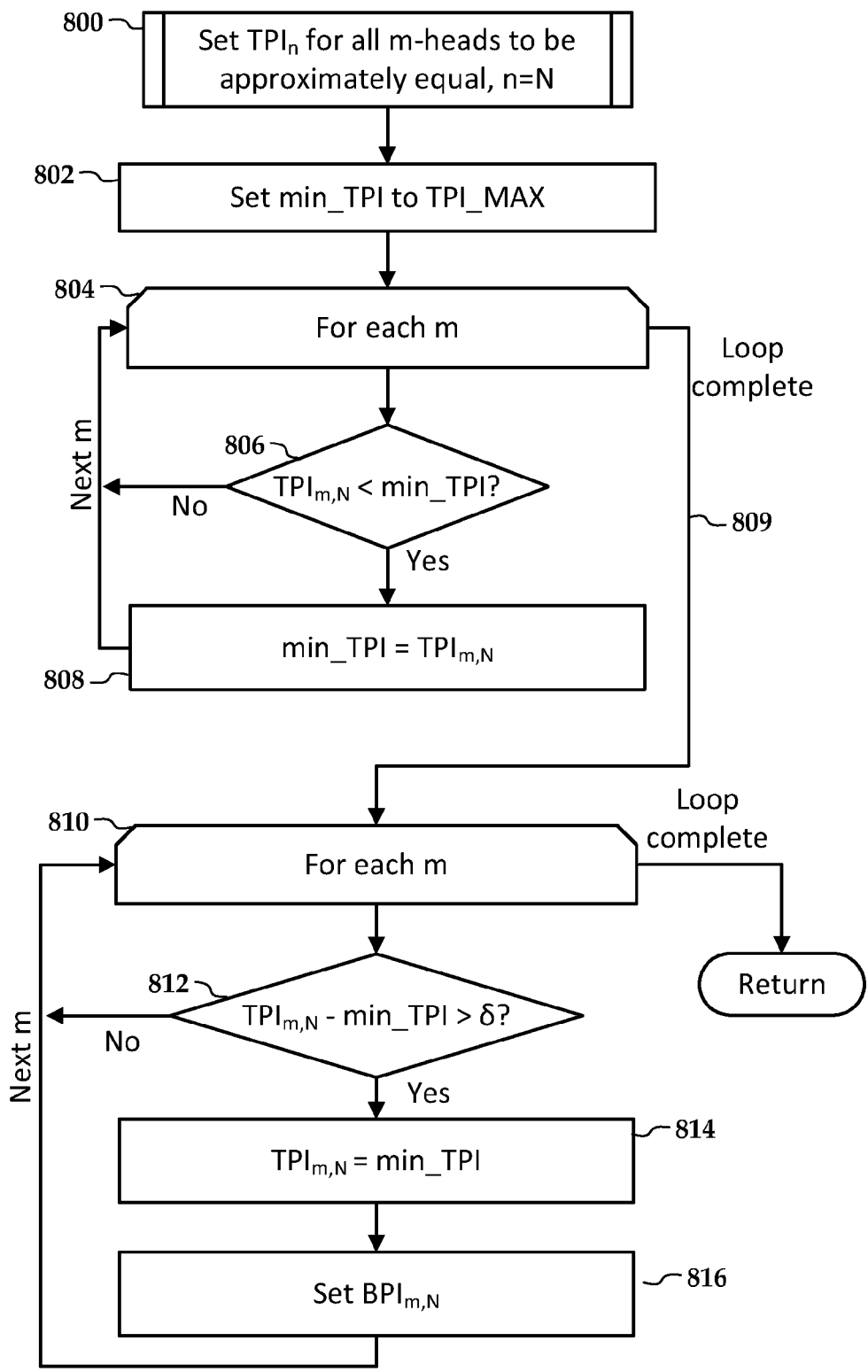

In FIG. 8, a flowchart shows another example procedure 800 for setting a zone specific TPI to be the same or nearly the same for all the m-heads that are paired together. In this example, the minimum TPI of the m-heads is selected, and the laser power of the other heads is increased to obtain a smaller TPI. The region variable, n, is set to a fixed value, N, for purposes of this procedure. At block 802, a temporary variable min TPI is initialized to a known high TPI limit, TPI MAX. Loop 804 iterates through each of the m-TPI values, comparing 706 them to the minimum. If a TPI is less than the current minimum, then the temporary value is set 808 to this TPI value. Upon exiting 809 the loop 710, min TPI will hold the smallest value of TPI for this region N.

Loop 810 again iterates through each of the m-TPI values. If it is determined 812 that a difference between the current TPI and min TPI is greater than a threshold value δ, then the current TPI is instead set 814 to the minimum value. If δ=0, then TPI for all heads will be the same although, as before, it may be acceptable to set δ>0. Because of the change to TPI in block 814, the BPI of the current head may optionally be set 816, e.g., increased to compensate for the decrease in TPI. This may involve repeating a characterization procedure similar to that performed at block 606 in FIG. 6, except that the TPI in this case will be fixed. The changes made in blocks 814 and 816 are recorded (e.g., in firmware) and used when accessing each region during operation of the device.

Figure 9:
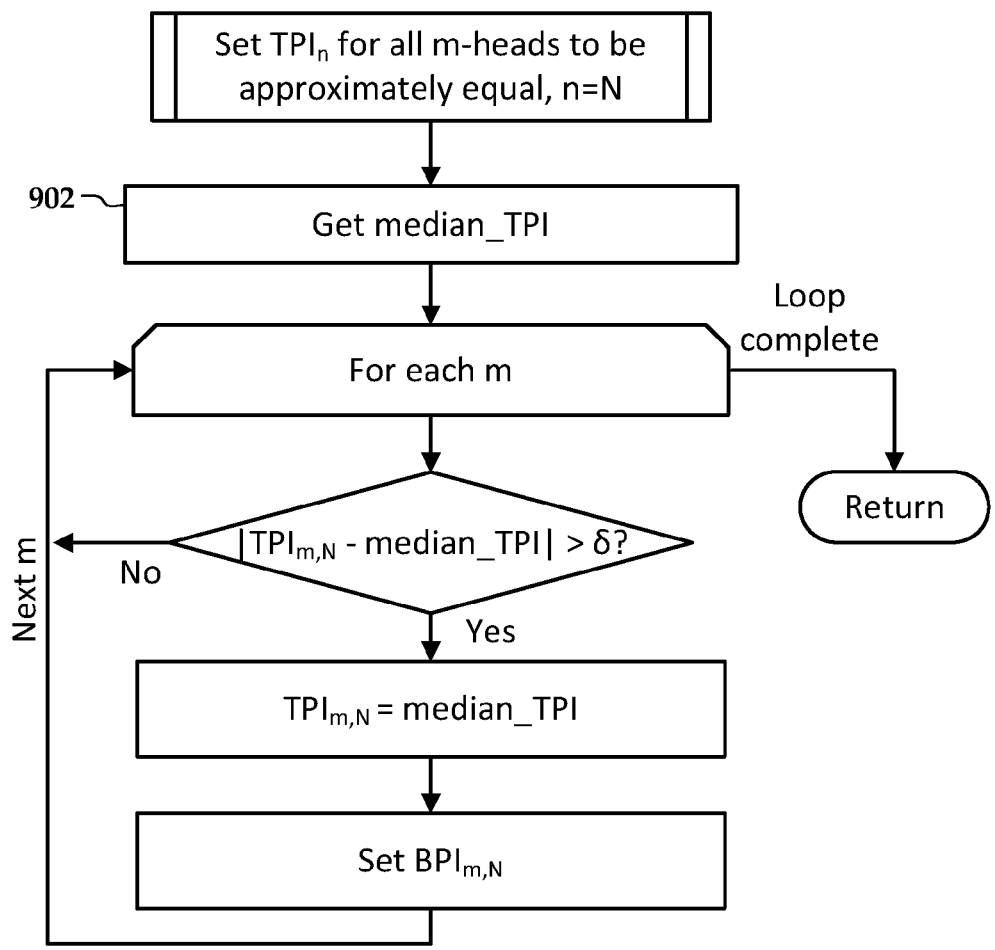

It will be understood that the procedures in FIGS. 7 and 8 are not mutually exclusive. For example, some regions of a recording medium may use the procedure in FIG. 7 and other regions use the procedure of FIG. 8. In some cases, where m>2, then a middle value of TPI will be selected for a given region N, and the TPI for some of the heads may be increased for this region, while TPI for others of the heads may be decreased for this region. This is shown in FIG. 9, where at block 902 a median value of TPI is selected. This could be a statistical median, average, etc., and may include a value that is currently not in the set of ($TPI_{0,N}$, $TPI_{1,N}$, . . . , $TPI_{m,N}$). In some cases, the media value may be shifted from center to, e.g., favor reducing laser power. The rest of the procedure in FIG. 9 proceeds similar to that described for FIGS. 7 and 8.

Figure 10:
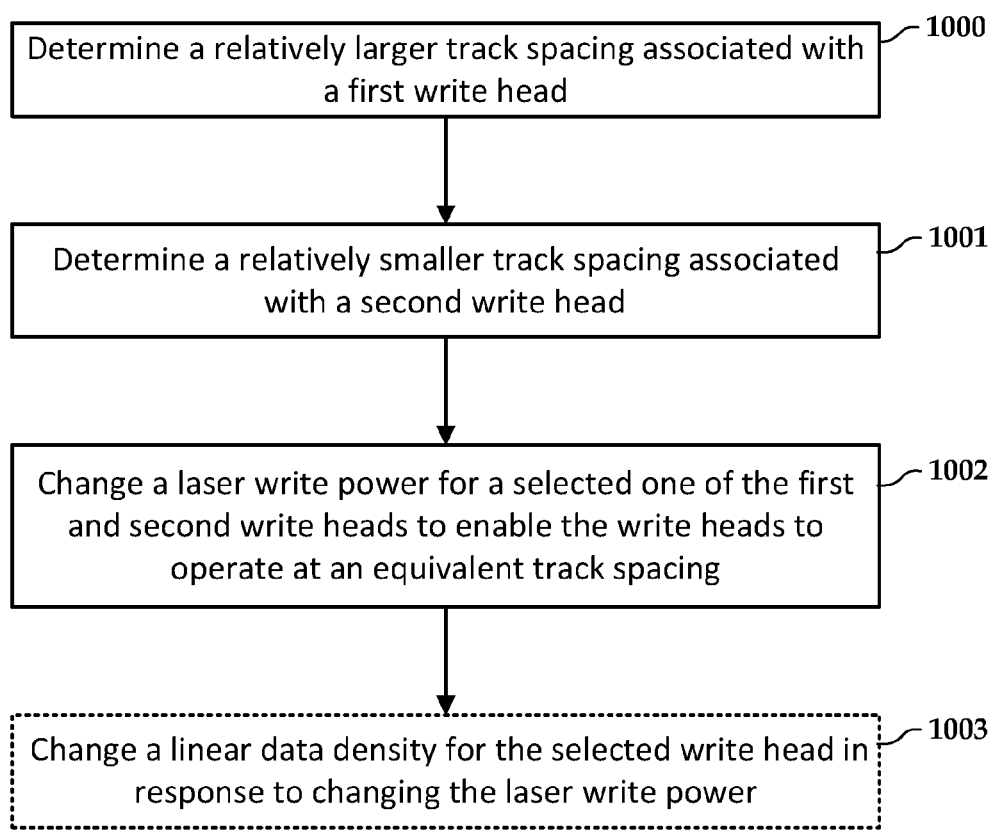

In FIG. 10, a flowchart illustrates a method according to an example embodiment. A relatively larger track spacing associated with a first write head is determined 1000, and a relatively smaller track spacing associated with a second write head is also determined 1001. The first and second write heads simultaneously write to (and may read from) respective different first and second surfaces of a heat-assisted recording medium. A laser write power for a selected one of the first write head and the second write head is changed 1002 to enable the first write head and the second write head to operate at an equivalent track spacing. Optionally, a linear density for the selected write head can be changed 1003 in response to changing the laser write power.

Unless otherwise indicated, all numbers expressing feature sizes, amounts, and physical properties used in the specification and claims are to be understood as being modified in all instances by the term "about." Accordingly, unless indicated to the contrary, the numerical parameters set forth in the foregoing specification and attached claims are approximations that can vary depending upon the desired properties sought to be obtained by those skilled in the art utilizing the teachings disclosed herein.

The various embodiments described above may be implemented using circuitry, firmware, and/or software modules that interact to provide particular results. One of skill in the arts can readily implement such described functionality, either at a modular level or as a whole, using knowledge generally known in the art. For example, the flowcharts and control diagrams illustrated herein may be used to create computer-readable instructions/code for execution by a processor. Such instructions may be stored on a non-transitory computer-readable medium and transferred to the processor for execution as is known in the art. The structures and procedures shown above are only a representative example of embodiments that can be used to provide the functions described hereinabove.

The foregoing description of the example embodiments has been presented for the purposes of illustration and description. It is not intended to be exhaustive or to limit the invention to the precise form disclosed. Many modifications and variations are possible in light of the above teaching. Any or all features of the disclosed embodiments can be applied individually or in any combination are not meant to be limiting, but purely illustrative. It is intended that the scope of the invention be limited not with this detailed description, but rather determined by the claims appended hereto.

What is claimed is:

1. A method, comprising:
   determining a relatively larger nominal track spacing associated with a first write head and a relatively smaller nominal track spacing associated with a second write head, the first and second write heads simultaneously writing to respective different first and second surfaces of a heat-assisted recording medium; and
   changing a laser write power for a selected one of the first write head and the second write head to enable the first write head and the second write head to operate at an equivalent nominal track spacing.

2. The method of claim 1, further comprising changing a linear data density for the selected write head in response to changing the laser write power.

3. The method of claim 1, wherein the relatively larger nominal track spacing and the relatively smaller nominal track spacing are obtained in a characterization procedure that achieves a target areal density for both the first and second write heads, respectively.

4. The method of claim 1, wherein, after changing the laser write power for the selected write head, the first and second write heads write at different linear densities.

5. The method of claim 1, wherein the selected write head is the first write head, and wherein changing the laser write power comprises decreasing the laser write power of the first write head so that the first write head writes at or near the relatively nominal smaller track spacing.

6. The method of claim 5, further comprising decreasing a linear bit density of the first write head in response to decreasing the laser write power of the first write head.

7. The method of claim 1, wherein the selected write head is the second write head, and wherein changing the laser write power comprises increasing the laser write power of the second write head so that the second write head writes at or near the relatively larger nominal track spacing.

8. The method of claim 7, further comprising increasing a linear bit density of the second write head in response to increasing the laser write power of the second write head.

9. The method of claim 1, further comprising:
   determining additional nominal track spacings associated with one or more additional write heads, the additional track spacings different than the relatively larger nominal track spacing and the relatively smaller nominal track spacing; and changing additional laser write powers for the respective one or more additional write heads to enable the first write head, the second write head, and the one or more additional write heads to operate at the equivalent nominal track spacing.

10. The method of claim 9, wherein the equivalent nominal track spacing comprises a median value of the additional nominal track spacings, the relatively larger nominal track spacing and the relatively smaller nominal track spacing, and wherein changing the laser write power and changing the additional laser write powers comprises increasing at least a first one of the laser write powers and decreasing at least a second one of the laser write powers.

11. The method of claim 9, wherein the equivalent nominal track spacing comprises a minimum value of the additional nominal track spacings, the relatively larger nominal track spacing and the relatively smaller track spacing.

12. The method of claim 9, wherein the equivalent nominal track spacing comprises a maximum value of the additional nominal track spacings, the relatively larger nominal track spacing and the relatively smaller track spacing.

13. An apparatus comprising:
a write channel configured to communicate with first and second write heads that simultaneously write to respective different first and second surfaces of a heat-assisted recording medium;
a laser controller configured to apply respective first laser power and second laser power to the first and second write heads during recording; and
a system controller coupled to the write channel and the laser controller and configured to:
determine a relatively larger nominal track spacing associated with the first write head and a relatively smaller nominal track spacing associated with the second write head; and
decrease the first laser power to enable the first write head to operate at the relatively smaller nominal track spacing.

14. The apparatus of claim 13, wherein the system controller is further configured to decrease a linear data density for the first write head in response to decreasing the first laser power.

15. The apparatus of claim 13, wherein the relatively larger nominal track spacing and the relatively smaller nominal track spacing are obtained in a characterization procedure that achieves a target areal density for both the first and second write heads, respectively.

16. The apparatus of claim 13, wherein, after decreasing the first laser power, the first and second write heads write at different linear densities.

17. An apparatus comprising:
a write channel configured to communicate with first and second write heads that simultaneously write to respective different first and second surfaces of a heat-assisted recording medium;
a laser controller configured to apply respective first laser power and second laser power to the first and second write heads during recording; and
a system controller coupled to the write channel and the laser controller and configured to:
determine a relatively larger nominal track spacing associated with the first write head and a relatively smaller nominal track spacing associated with the second write head; and
increase the second laser power to enable the second write head to operate at the relatively larger nominal track spacing.

18. The apparatus of claim 17, wherein the system controller is further configured to increase a linear data density for the second write head in response to increasing the second laser power.

19. The apparatus of claim 17, wherein the relatively larger nominal track spacing and the relatively smaller nominal track spacing are obtained in a characterization procedure that achieves a target areal density for both the first and second write heads, respectively.

20. The apparatus of claim 17, wherein, after increasing the second laser power, the first and second write heads write at different linear densities.

* * * * *